May 6, 1958     I. CORNMAN     2,833,249
HAND CONTROLLED RIGID ANIMAL LEASH
Filed June 25, 1956
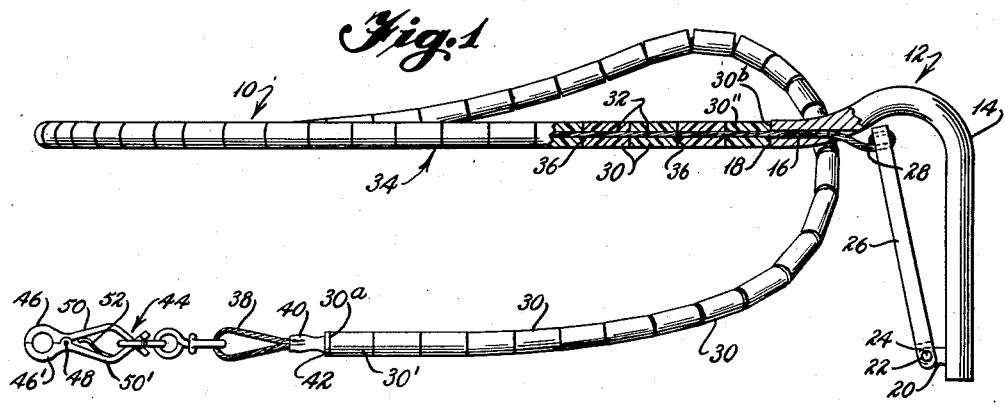
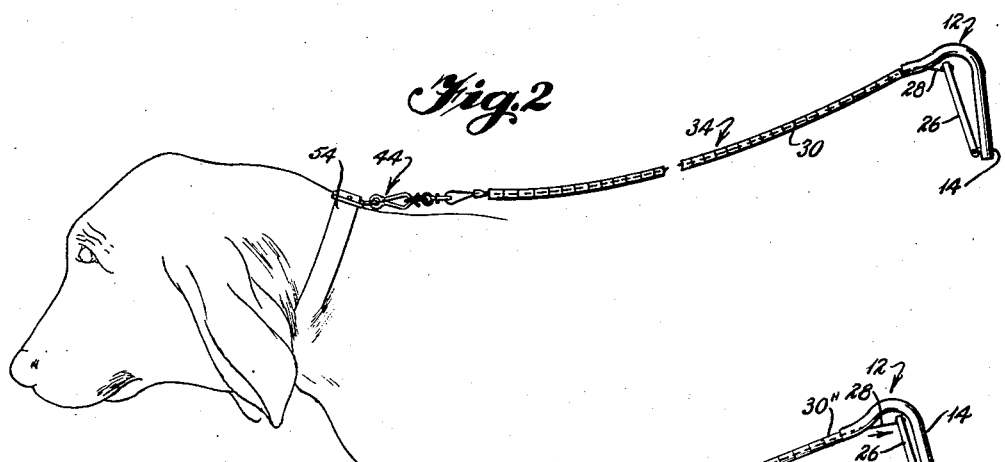
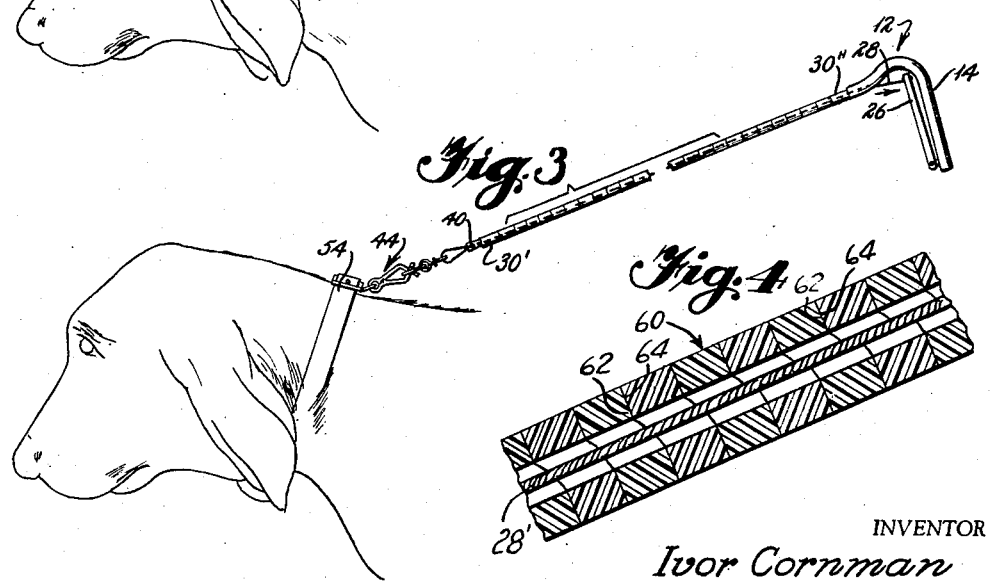
INVENTOR
*Ivor Cornman*
BY *Beale & Jones*
ATTORNEYS

# United States Patent Office 2,833,249
Patented May 6, 1958

2,833,249

HAND CONTROLLED RIGID ANIMAL LEASH

Ivor Cornman, Washington, D. C.

Application June 25, 1956, Serial No. 593,659

8 Claims. (Cl. 119—109)

This invention relates to restraining devices or more particularly animal leashes. Still more specifically, this invention presents a leash which is normally flexible as any other leash but which may be made rigid at the desire of the master of the animal.

It is an object of my invention to present a leash of light yet durable construction which can be used as any other leash and, in addition, can be made rigid when so desired by the master.

Another object of my invention is to provide a leash which is normally flexible but which by a light pressure of the master can become rigid to serve as a more effective restraining device.

Yet, another object of my invention is to present a leash which has an attractive appearance and which can be made in a variety of colors.

Animal owners who live in a city house or apartment realize that in order to foster healthy animals it is essential that their pets be exercised. This presents a problem in congested areas where the pet cannot be allowed to run and play freely. In order that the pet might receive such exercise, owners are often forced to take their pets for a walk using some restraining device such as a leash. Unhappiness is often connected with such an arrangement. For instance, the owners of active pets are loathe to so exercise them because such pets, especially untrained ones, have the habit of jumping up on their masters and soiling or mussing their clothes. Also, an active pet on the end of a leash is prone to run around the master, wrapping its leash about him. Such activity is frustrating to the master, and sometimes embarrassing.

My novel restraining device ends this undesirable feature of exercising a pet. My leash is so constructed that a gentle pressure by the master on its handle can cause it to become rigid, thereby keeping the pet at a desired distance from the master and thwarting the attempts of the pet to jump up on the master. Similarly, by making my leash rigid, the master can frustrate the disposition of the pet to run around him and to encircle him with its leash.

My leash is also desirable in training pets to maintain a proper distance from their master as in teaching the pet to "heel."

Additionally, when made rigid, my animal leash can be used as a stick to impart discipline to the animal in quick sharp raps.

Yet, while my leash can assume a rigid character, it normally is flexible as any other leash and is equally light in weight and as durable.

In the prior art there are leashes which are rigid. For instance, one prior leash comprises a rigid metallic tube of fixed length through which a spring passes. The handle is attached to one end of the spring, and the animal collar is attached to the other. Using this device, the master can keep his pet away from him. However, this type of leash cannot be made flexible as can mine and this prior leash is undesirable for purposes such as in rounding corners, or where the animal and its master must be close together, such as in an elevator. A permanently rigid leash also presents storage problems since it cannot be put into a drawer, for instance.

Obviously, my leash which can be flexible, does not have these disadvantages. The optional flexible or inflexible character of my leash is derived generally from its simple structure which comprises a flexible element which is encircled by a member which can become rigid when the flexible element is shortened. More specifically, in the preferred form, the rigidifying member comprises a plurality of cylinders with axial bores through which the flexible member is threaded. As the flexible member is shortened by means described below, the cylinders are compressed into end-wise abutment, effecting a straight, rigid length.

Further objects and advantages of my invention will appear in the material which follows. A preferred form of my invention is shown in the drawings, wherein like reference numerals are used to designate like parts and wherein, generally, Fig. 1 is a view of my leash, partially in section, in the flexible or non-rigid disposition;

Fig. 2 shows in my reduced scale my leash attached to an animal, said leash being in the flexible state;

Fig. 3 shows in reduced scale my leash as attached to an animal, said leash being in the rigid state;

Fig. 4 is an enlarged sectional view of a portion of a modified form of the invention.

A preferred embodiment of my invention is shown in Fig. 1, wherein the leash is designated broadly as 10. It comprises a handle 12 including a more or less L-shaped frame 14 having a longitudinal aperture 16 in a portion thereof. The aperture 16 terminates centrally in one end 18 of the frame 14. Adjacent the other end of the frame is an ear 20 with an aperture 22. Pivotally attached to the ear 20 by a rivet 24 through the aperture 22 is the flexible-element-tensioning member 26. The tensioning member is freely pivotable with respect to the frame 14 and is connected at its free end in a suitable manner to the flexible element 28.

From its connection with the free end of the tensioning member 26, the flexible element 28 extends freely through the aperture 16 in the frame 12. The flexible element 28 is then threaded through a plurality of non-compressible cylindrical members having axial bores 32. In the preferred embodiment, these non-compressible cylindrical members 30 comprise the rigidifying member 34. Preferably, the cylindrical members are made from a plastic which is light of weight and rigid of character and which is capable of withstanding compressive forces without chipping or cracking. The ends 36 of each cylindrical members 30 are cut perpendicular to the axis of the cylindrical member.

At the opposite end of the flexible member from the handle, an eye 38 is formed. When, as in the preferred embodiment, the flexible element 28 is a wire cable, the eye may be formed by a simple metallic cable clamp 40 which is simply clamped down, embracing the doubled-over cable, preventing relative movement between the two portions thereof. Also, this metal cable clamp 40 serves as an abutment member as will later be described. Optionally, the washer 42 may be positioned between the cable clamp and the adjacent cylindrical member 30 to form part of the abutment member.

Through the eye 38 may be connected the conventional spring clip attachment piece 44, a type of which is available at any hardware store. One of the preferred types has two jaws, such as 46 and 46' which pivot about the pin 48 when the arms 50 and 50' are pressed together opposing the force of the spring 52.

In operation, the attachment piece 44 of my leash is attached to the animal collar 54 as shown in Fig. 2.

The handle 12 of the leash is held loosely by the master. This loose gripping allows the flexible element 28 to relax, whereby the leash is in its flexible disposition.

When the master desires to make the leash rigid, he applies pressure to the flexible element tensioning member 26, squeezing it with his fingers in the direction of the frame 14 held in his palm. Obviously, this shortens the length of the flexible member 28 between the abutment piece 40 and the end 18 of the frame 14. In this manner, the cylinders 30 comprising the rigidifying member 34 are forced into end-wise abutment with each other. The cylinder 30' adjacent the abutment piece 40 has its proximate end 30a forced into abutment with the abutment piece and the cylinder 30" has its proximate end 30b forced into abutment with the end 18 of the frame 14. Thus, the rigidifying member 34 becomes a straight, rigid length.

Obviously, changes may be made from the preferred embodiment above described and still lie within the scope of my invention. For instance, the handle 12 could comprise a frame having the flexible-element-tensioning member movable with respect thereto in a sliding rather than a pivoting relation.

Also, the rigidifying member 34 could comprise a spirally wound spring 60 (see Fig. 4) rather than the non-compressible cylindrical members 30. Such a spring, with the flexible element 28' threaded therethrough, is especially effective if made out of wire having a square or rectangular cross-section whereby as the flexible element is shortened, the adjacent planar surfaces 62 and 64 of the spring wire between adjacent loops are forced into abutment.

Thus, I have invented a restraining device which incorporates the desirable features of a flexible leash with the advantage of structure which enables it to become rigid at the desire of the master. My leash is light of weight and durable. It can be produced inexpensively, and it is extremely simple to operate.

Having thus described my invention in rather full detail, it will be understood that these details should not be strictly adhered to but that various changes and modifications may suggest themselves to one skilled in the art, all falling within the scope of the invention as defined by the subjoined claims.

What is claimed is:

1. An animal leash comprising a handle adapted to be held by the master, said handle having a frame with a flexible-element-tensioning member comprising a bar pivoted at one end to said frame and free at the other end, a flexible element attached to the free end of said bar, said flexible element extending freely through a part of said frame, then through a rigidifying member which becomes rigid under compression, said flexible element then being connected at its other end to an attachment piece adapted to be secured to an animal collar, whereby as said flexible-element-tensioning member is moved with respect to said frame in one direction or another, said rigidifying member becomes stiff or relaxes.

2. An animal leash as in claim 1 wherein said rigidifying member comprises a plurality of non-compressible cylindrical members each having axial bores through which said flexible member is threaded.

3. An animal leash as in claim 1 in which said rigidifying member comprises a spiral member.

4. An animal leash which is normally flexible but which can be made rigid comprising a handle adapted to be held by the master, said handle having a frame, a flexible-element-tensioning member comprising a bar pivoted at one end to said frame and free at the other end, a flexible element attached to the free end of said bar, said flexible element extending freely through an aperture in said frame, said flexible element then being threaded through a plurality of non-compressible cylindrical members each having an axial bore, an abutment member, a portion of which is fixedly mounted on said flexible member on the opposite side of said cylindrical members from said handle and an attachment piece adapted to be attached to an animal collar connected to said flexible member on the opposite side of said abutment member from said cylindrical members, whereby as said flexible-element-tensioning member is pivoted in one direction, the length of the flexible element between the frame and the abutment member is diminished forcing adjacent cylindrical members into end-wise abutment, the proximate end of the cylindrical member adjacent the abutment member into abutment with said abutment member, and the proximate end of the cylindrical member adjacent the frame into abutment with said frame, whereby said cylindrical members form a straight rigid length.

5. An animal leash as in claim 4 wherein the abutment member includes a washer against which the cylindrical member adjacent the attachment piece may abut.

6. An animal leash which is normally flexible but which can be made rigid comprising a handle adapted to be held by the master, said handle having an L-shaped frame having a substantially longitudinal aperture through one end thereof, a bar pivoted at one end to the second end of said L-shaped frame, a wire cable attached to the free end of said bar, said cable extending freely through the aperture in said frame and then through a plurality of non-compressible right cylindrical members, each having an axial bore, and then being fixed to an animal collar attachment piece, whereby as said bar is pivoted in one direction the length of the flexible element between the frame and the attachment piece is diminished forcing adjacent cylindrical members into endwise abutment to form a straight rigid length.

7. An animal leash comprising a handle adapted to be held by the master, said handle having a frame with a flexible-element-tensioning member comprising a bar movable with respect to said frame, a flexible element attached to said bar, said flexible element extending freely through a part of said frame, then through a rigidifying member which becomes rigid under compression, said flexible element being connected at its other end to an attachment piece adapted to be secured to an animal collar, whereby as said flexible element tensioning member is moved with respect to said frame in one direction or another, said rigidifying member becomes stiff or relaxes.

8. An animal leash comprising a handle adapted to be held by the master, said handle having a frame with a flexible-element-tensioning member comprising a bar pivoted to said frame, a flexible element attached to said bar, said flexible element extending freely through a part of said frame, then through a rigidifying member which becomes rigid under compression, said flexible element then being connected at its other end to an attachment piece adapted to be secured to an animal collar, whereby as said flexible-element-tensioning member is moved with respect to said frame in one direction or another, said rigidifying member becomes stiff or relaxes.

References Cited in the file of this patent

UNITED STATES PATENTS

| | | |
|---|---|---|
| 548,062 | Joyner | Oct. 15, 1895 |
| 2,314,504 | Lifchultz | Mar. 23, 1943 |
| 2,337,970 | Cassell | Dec. 28, 1943 |
| 2,421,279 | Marty | May 27, 1947 |

FOREIGN PATENTS

| | | |
|---|---|---|
| 587,614 | Germany | Nov. 6, 1933 |
| 621,905 | Great Britain | Nov. 6, 1946 |